(12) United States Patent
Brunet et al.

(10) Patent No.: US 10,026,090 B2
(45) Date of Patent: Jul. 17, 2018

(54) SYSTEM AND METHOD OF CREATING AND USING A REFERENCE DEVICE PROFILE

(71) Applicant: CrowdCare Corporation, Richmond Hill (CA)

(72) Inventors: Jeffrey Brunet, Aurora (CA); Yousuf Chowdhary, Maple (CA); Ian Collins, Markham (CA); Subramanian Kanthi, Vaughan (CA)

(73) Assignee: CrowdCare Corporation, Richmond Hill, Ontario (CA)

( * ) Notice: Subject to any disclaimer, the term of this patent is extended or adjusted under 35 U.S.C. 154(b) by 115 days.

(21) Appl. No.: 14/562,856

(22) Filed: Dec. 8, 2014

(65) Prior Publication Data

US 2015/0161616 A1 Jun. 11, 2015

Related U.S. Application Data (60) Provisional application No. 61/963,587, filed on Dec. 9, 2013.

(51) Int. Cl.
| | |
|---|---|
| *G06F 15/16* | (2006.01) |
| *G06Q 30/00* | (2012.01) |
| *G06F 11/34* | (2006.01) |
| *G06F 1/24* | (2006.01) |

(52) U.S. Cl.
CPC .............. *G06Q 30/016* (2013.01); *G06F 1/24* (2013.01); *G06F 11/3409* (2013.01)

(58) Field of Classification Search
CPC .................... G06Q 30/016; G06F 11/3409
USPC .......................... 709/203, 217, 227
See application file for complete search history.

(56) References Cited

U.S. PATENT DOCUMENTS

| | | | | |
|---|---|---|---|---|
| 2006/0007870 A1* | 1/2006 | Roskowski | ............. | H04L 43/00 370/252 |
| 2006/0007901 A1* | 1/2006 | Roskowski | ........... | H04W 24/00 370/338 |
| 2006/0023642 A1* | 2/2006 | Roskowski | ........... | H04W 24/00 370/254 |
| 2011/0264523 A1* | 10/2011 | Scott | .................... | G06Q 10/101 705/14.52 |
| 2014/0136451 A1* | 5/2014 | Marti | .................... | G06N 99/005 706/12 |
| 2015/0038130 A1* | 2/2015 | Mao | ........................ | H04W 8/22 455/418 |

* cited by examiner

*Primary Examiner* — Phuoc Nguyen
(74) *Attorney, Agent, or Firm* — White and Williams LLP (57) ABSTRACT

A method is provided for determining a reference device profile. Device profiles are gathered from a plurality of devices having at least one characteristic in common. Each device profile has a plurality of parameter values. The device profiles are compared according to at least one device health metric. Parameter values associated with an optimum value of the device health metric are identified. Using these identified parameter values, a reference device profile is compiled. A method is also provided for enabling a target device to be conformed with a reference device profile.

12 Claims, 6 Drawing Sheets

SYSTEM AND METHOD OF CREATING AND USING A REFERENCE DEVICE PROFILE

CROSS-REFERENCE TO RELATED APPLICATIONS

This application claims the benefit of U.S. Provisional Patent Application No. 61/963,587, filed Dec. 9, 2013 and entitled "System and Method of Creating and Using a Reference Device Profile," which is incorporated herein by reference in its entirety.

FIELD OF INVENTION

The invention in general relates to customer care systems for electronic devices and in particular relates to electronic communication devices for example Smartphones, tablets, TVs, entertainment systems, vehicles, navigation systems etc.

BACKGROUND

The current method of gathering and obtaining device information required for diagnostics is manual and therefore complex, time-consuming and prone to human errors. In the course of a customer care session for a device, a CSR (Customer Service Representative) must undertake the extensive and time-consuming task of asking the user complex questions pertaining to their wireless devices for problem diagnosis. This situation is only getting worse with the passage of time as devices become more powerful and capable of handling more sophisticated tasks. This requires CSRs to be experts on many types of devices and their applications, and also requires users to spend increased time on the telephone to receive support for their applications. The result is increased support costs, increased call handling times, complex diagnostic processes and overall frustration. Therefore customers no longer want to call service providers to make changes to their services or to get some basic problem resolved.

One existing method to overcome the above issues is self-care including customer care apps and web based self-care systems, whereby information is provided to the users and they can use the information to resolve some of the basic issues themselves, thus helping reduce some of the costs.

Although such systems deliver a more convenient, always-on communication channel, that helps lower cost of customer service and reducing staff workload, by eliminating the number of customer service calls, there are still serious shortcomings.

One common issue with such systems is that each customer has to solve their own problem from the beginning. As such methods lack automation, the user is required to sift through massive amounts of data manually to get to the relevant information. Thus what one customer has learned cannot be passed onto another customer in a codified or systematic method.

Another drawback is that the devices are complicated with hundreds of user changeable parameters. If a customer makes too many changes or installs too many apps that may conflict with each other, or in wanting to fine tune their device by changing the parameters, they may actually make its performance worse than before.

One typical way to get out of this situation is to revert the device to factory settings; typically devices have two options "Factory Data Reset" which erases all data on the device, or a "Settings Reset" which resets the device settings to its factory settings without erasing the data. In either case all personalization of the device is lost. Further, the factory reset or settings reset state may not take advantage of all available updates or currently available improvements for that device type.

Therefore we note that prior art methods have inherent limitations and are in need of improvement.

SUMMARY

Broadly speaking, the present invention provides a method for creating a reference/standard device profile by gathering and analyzing profiles from multiple devices with the same make, model, OS and firmware version and then using this reference/standard device profile to optimize other devices of the same make, model with the same OS and firmware version. The system and method of invention provides a meaningful benefit by providing a solution whereby the best parameter settings that produce the most optimum results in a large set of devices are identified and made available to other devices with the same make, model, running the same OS and firmware versions.

The system and the method provide a codified knowledgebase where rules may be used to diagnose a problem and/or fine tune the performance of various types of devices. A standard/reference profile is created by analyzing profiles from multiple devices with the same make, model and running the same OS and firmware version. The reference/standard device profile is composed of parameter values based on identifying the best of the best, using a wide array of criteria to judge the health of a device. This enables running a diagnosis on another device by comparing its current profile with the standard/reference profile for its make, model, OS and firmware version; and updating the current profile of the said device with parameters from the standard/reference profile, in order to either fix a problem or optimize its performance.

The reference/standard device profile may be created by gathering and analyzing a large set of profiles from multiple devices with the same make, model, OS and firmware versions; this reference/standard device profile is then used to tune up a device with the same make and model, by comparing its existing device profile with the reference/standard device profile and then changing one or more parameters of the device profile to match the reference/standard device profile.

In another embodiment, a reference/standard device profile may be created by gathering and analyzing a large set of profiles from multiple devices with the same make, model, OS and firmware versions; this reference/standard device profile is then used to fix a device with the same make and model, by comparing its existing device profile with the reference/standard device profile and then changing one or more parameters of the device profile to match the reference/standard device profile.

In another embodiment using an app installed on two respective devices, a first peer device connects to a second peer device using a P2P technology e.g. Bluetooth; the app on the second peer device compares its current device profile with the profile of the first peer device, and then using a user interface allows the user of the second peer device to change one or more parameters of its current device profile to match the parameters of the device profile of the first peer device. In an alternate embodiment after the comparison, the parameters of the current device profile of the second peer device may be changed automatically to match the parameters of the reference/standard device profile obtained from the first peer device.

In one embodiment multiple reference/standard device profiles are gathered and analyzed to create a reference/standard device profile for a future device.

Devices that can benefit from the system may include but are not limited to devices exemplified here, for example a Smartphone, a tablet, a game console, a computer, a server, network appliance, set-top box, SmartTV, embedded device, computer expansion module, personal computer, laptop, tablet computer, personal data assistant, game device, e-reader, any appliances having internet or wireless connectivity, onboard automotive devices such as navigational and entertainment systems and the like.

Thus we note that the system and method of invention provides a meaningful benefit by providing a solution whereby the best parameter settings that produce the most optimum results in a large set of devices are identified and made available to other devices with the same make, model, running the same OS and firmware versions.

According to a first aspect of the invention, a method is provided for determining a reference device profile. Device profiles of a plurality of devices are gathered having at least one characteristic in common. Each device profile has a plurality of parameter values. The plurality of device profiles are compared according to at least one device health metric. Parameter values associated with an optimum value of the device health metric are identified. The identified parameter values are compiled to build a reference device profile.

Various characteristics may be used to define the sub-set of relevant device profiles. For example, these may have in common make, model, OS or firmware version. The device profiles may also (or in the alternative) be broken down by region or location, or by usage pattern or type of usage (e.g. heavy multimedia use, heavy gaming use, etc.).

Preferably, the comparing step (and/or the identifying step) is done by a rules engine.

The health metric may be anything useful to mark a device profile as having a desirable performance or lack of undesirable attributes or performance issues. For example, this may be a short error log or crash history or an absence of severe errors or crashes. Other possible health metrics include long battery life, or absence of malware.

The method may also be extended to an individual target device. The method may include gathering a profile of the target device. Then, the method may include comparing the gathered profile to the reference device profile, and displaying the delta between parameters of the reference device profile and corresponding parameters of the gathered profile.

In certain embodiments, the delta may be displayed on the target device itself, or on a display in communication with the target device.

The method may also include providing an option to conform a parameter of the gathered profile to match or approximate that of the reference device profile.

Alternatively or in addition, the method may also include automatically resetting or adjusting a parameter of the gathered profile to match or approximate that of the reference device profile.

In some embodiments, the comparing may be done using a MapReduce algorithm (or other efficient data comparison algorithm). The plurality of devices may be initially categorized into healthy and not so healthy categories. The comparing is then used to find differences between the parameters of the healthy devices and the corresponding parameters of the not so healthy devices. Matching parameters may be ignored.

According to a second aspect of the invention, a method is provided for enabling a target device to be conformed with a reference device profile. A reference device profile is selected for a device having at least one characteristic in common with the target device. A device profile of the target device is gathered. The device profile has a plurality of parameter values. The parameter values of the device profile of the target device are compared with parameter values of the reference device profile. At least one parameter value that is different from those of the reference device profile is displayed on the target device. An option may also be displayed to conform each parameter value. Upon receiving a request from the target device to conform one of the parameter values, the parameter value of the target device may be automatically adjusted or reset to match or approximate the corresponding parameter value of the reference device profile.

In one embodiment, the reference device profile is a profile of a peer device and the parameters of the reference device profile are conformed between the devices over a peer-to-peer connection. For example, the peer-to-peer connection may use Bluetooth, NFC, WiFi, or infrared communication.

In another embodiment, the reference device profile is a prior profile of the target device.

Preferable, the selecting step includes selecting a reference device profile associated with a positive at least one device health metric.

DETAILED DESCRIPTION

Before embodiments are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation.

It should also be understood that many components and items are illustrated and described as if they were hardware elements. However, in at least one embodiment, the components comprised in the method and tool are actually implemented in software.

The present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages.

The embodiments of the systems and methods described herein may be implemented in hardware or software, or a combination of both. However, preferably, these embodiments are implemented in computer programs executing on programmable computers each comprising at least one processor, a data storage system (including volatile and nonvolatile memory and/or storage elements), and at least one communication interface. A computing device may include a memory for storing a control program and data, and a processor (CPU) for executing the control program and for managing the data, which includes user data resident in the memory and includes buffered content. The computing device may be coupled to a video display such as a television, monitor, or other type of visual display while other devices may have it incorporated in them (iPad, iPhone etc.). An application or an app other simulation may be stored on a storage media such as a DVD, a CD, flash memory, USB memory or other type of memory media or it may be downloaded from the internet. The storage media can be coupled with the computing device where it is read and program instructions stored on the storage media are executed and a user interface is presented to a user. For example and without limitation, the programmable computers may be a server, network appliance, set-top box, SmartTV, embedded device, computer expansion module, personal computer, laptop, tablet computer, personal data assistant, game device, e-reader, or mobile device for example a Smartphone. Other devices include appliances having internet or wireless connectivity and onboard automotive devices such as navigational and entertainment systems.

The program code may execute entirely on a device or partly on a device as a stand-alone software package; partly on a device and partly on a remote computer or entirely on the remote computer or server. In the latter scenario, the remote computer may be connected to the device through any type of network, including a local area network (LAN) or a wide area network (WAN), or the connection may be made to the internet through a mobile operator network (e.g. a cellular network). The code is specialized to execute functions described herein which enable a smoother and more efficient technological process.

Increasingly customers do not want to call service providers to make changes to their services or to get some basic problem resolved. Web based self-care systems are able to deliver a more convenient, always-on, communication channel that helps lower cost of customer service and reducing staff workload, by eliminating the number of customer service calls. Self-care enables customers to check their balances, view financial transactions and invoices, modify personal details, change billing cycle dates, modify payment methods, change service parameters, and most importantly troubleshoot some of the basic issues that they may encounter. In one embodiment a system and method of self-care is provided that enables the creation of a standard/reference device profile based on the analysis of a large number of device profiles obtained from multiple devices of the same make and model over a period of time. This composite reference/standard device profile is composed of parameter values based on the best of the best using a wide array of criteria to judge the health of a device.

Having such a system thus reduces expense and increases the overall efficiency of the system, as more devices will be operating at or near optimum and will require less customer care resources to support them.

Figure 1:
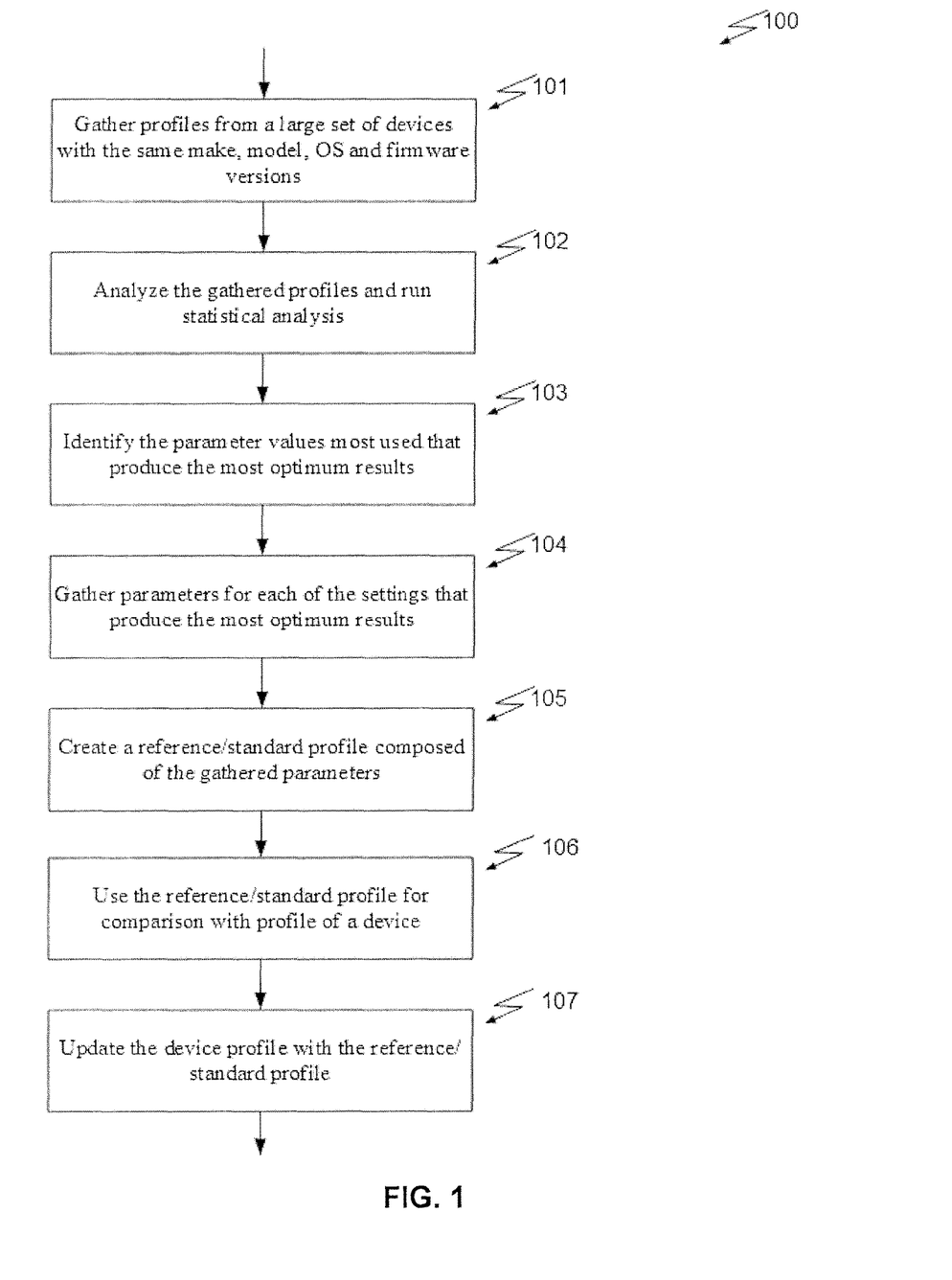
FIG. 1 is a flow diagram illustrating determining a reference device profile from analysed gathered profiles of a large set of devices, and using the reference device profile to update the device profile of an individual (target) device according to an aspect of the present invention.

Device profiles are gathered from a large set of devices with the same make, model, OS and firmware versions 101. One method of gathering device profiles is to have an app installed on the device that queries the device for its settings and then sends these settings to the server. One such app is described and taught in U.S. patent application Ser. No. 13/968,631, filed Aug. 16, 2013, which is incorporated herein by reference. Another related system using a device-based approach is described and taught in U.S. patent application Ser. No. 14/256,640, filed Apr. 18, 2014, which is incorporated herein by reference.

This device profiles gathered from multiple devices may be updated on a periodic basis so that they are relatively fresh when used in creating a reference/standard device profile. In an alternate embodiment the device profile information is gathered from the devices in real time to ensure that it accurately reflects the most current set of information.

In another embodiment multiple device profiles may be gathered from the same device over a period of time.

Information that can be gathered from the device may include but is not limited to: the device make, model and manufacture information; applications (commonly referred to as "apps") installed on the device; apps and processing running on the device; certificates on the device; user profile information; the character of any passcode used to authenticate a user (e.g. whether a password/passcode is used and the relative strength of that password, such as the number of characters); operating system of the device; information regarding whether the device operating system has been tampered with by the user (e.g. an iOS device has been jailbroken, or a Google Android device has been rooted); and settings for SMTP servers, Gateway IP addresses, APN, Build Versions, list of malicious apps, etc.

In one embodiment the app may query the device and after gathering the device profile may preferably send it to the server immediately. In an alternate embodiment the app may query the device to gather the device profile but may not send the device profile to the server immediately, instead it may wait for a triggering event e.g. a particular time for example 3:00 am in the morning when there is little activity on the device, or when the device moves into a WiFi zone, or when the user allows it, etc. There may be other events that trigger this sending of device profile to the server and the intent is to cover all practical embodiments.

The gathered device profiles are then analysed and a statistical analysis is run 102. In the preferred embodiment examples of items that may be analyzed for the performance of the device may include but are not limited to screensavers, screensaver timeouts, WiFi settings, e-mail settings, how often e-mail is checked, apps installed, types of apps installed, CPU usage, memory usage over time, error logs, length of the errors logs while also looking at the severity of the errors in each log, number of crashes, frequency of crashes, battery usage/drainage, memory usage and memory leaks, number of apps installed on the device, the mix of apps installed on the device, number of calls that the user of the device may have made to the customer care/helpdesk of the device or service provider (e.g. Smartphone service provider).

The analysis of the device profile parameters may be carried out using a rules engine. A rules engine is a software system that executes one or more rules in a runtime environment. A rule engine may be viewed as a sophisticated if/then statement interpreter. The if/then statements that are interpreted are called rules.

The logic for dealing with the device profiles may be coded in the form of rules. A rule consists of some number of conditions and some number of actions. Generally the rules are written in a high-level business language that relates to the domain, storing the rules in the repository. A database may be used as the preferred and exemplary embodiment to store the rules. In another embodiment the rules may be stored in a list, in a table or other method that may be suitable for so doing.

A rule can generally be represented as IF CONDITION(S) THEN RECOMMENDATION(S)/FIX(ES). It can consist of one or more conditions (the "IF"). One or more conditions can be grouped together by "and" and "or" and the order of operations can be further defined using brackets. In each condition, there could be a device attribute, a conditional operator (=, >, <, !=, exists, not exists) and then a text box in which to enter static text, numeric, date-time value or another device attribute. These conditions can then be rearranged, grouped, and joined together to form a bigger condition.

A rule may also contain a recommendation or a fix (the "THEN"). When saved, the rules may follow the Rules Lifecycle (status including but not limited to DRAFT, PENDING, VALIDATION, REJECTED, VALIDATED (Nth), ACTIVE, INACTIVE) and only active rules may be disseminated to other sources.

It is to be understood that the rules engine is not necessarily linear when executing the rules. There may be a common starting point when executing the rules, but as the rules get executed and as information gathered from the device is analyzed, one rule may trigger another rule that may be part of another set of rules. There may also be loops, so that there are rules embedded within rules, or a rule many call another rule as part of its execution. The rule that is called from within the loop or the rule that is called as part of the execution of another rule may not fixed or static but may depend on the situation and vary as needed.

In the preferred embodiment there may be a central master repository that stores the reference/standard device profiles for many devices. There may be regional repositories that are subsets of the master repository based on either the region e.g. a regional repository for Asia-Pacific countries or device manufacturer specific repository e.g. a repository for all Samsung devices or a device service provider specific repository e.g. a repository for all devices that are offered by T-Mobile.

There may also be a device manufacturer specific repository of rules, where only rules pertaining to the devices that are manufactured by this particular manufacturer are stored.

The parameter values most used that produce the most optimum results are identified 103. For example upon analysis of 100 device profiles it may be discovered that most devices with the shortest error logs have certain settings in common while devices with extensive error logs may share certain other settings; thus it can be established that having certain kinds of settings may produce errors on the device and hence the extensive error logs. Therefore taking the settings of the devices that have the shortest error logs to constitute a reference/standard device profile is advantageous since this reference/standard device profile can be used for comparison with the existing device profiles. Thus for example parameters of existing profiles of devices that have extensive error logs can be changed to match the parameters of the reference/standard device profile. This process is described in more detail later in the document with respect to FIG. 6.

Parameters are gathered for each of the settings that produce the most optimum results 104. In fact when performing an analysis of the device profiles gathered from multiple devices, many different types of items may be taken into account as exemplified earlier e.g. error logs, number of errors in an error log, severity of errors, number and frequency of crashes of the device etc.

A reference/standard profile is created, which is composed of the gathered parameters 105. This process may be repeated for each of the parameters of a device profile and a best of the best set of settings may be used to compose the reference/standard device profile.

The standard/reference profile can then be used for comparison with a profile of a device 106. As mentioned earlier a rules engine may be used for this comparison whereby the knowledge is codified in the rules.

The device profile of the device can then be updated with the reference/standard profile 107. The updating of the device parameters may be to diagnose and overcome a problem and/or to fine tune the performance of a device.

In one embodiment the parameters that are updated may be narrowed down based on the make or model of the device, its operating system, operating system version, firmware version, language, area of use, user preferences, etc.

In one embodiment there may be more than one reference/standard profiles for a devices such that each reference/standard profile may apply to a different scenario.

Figure 2:
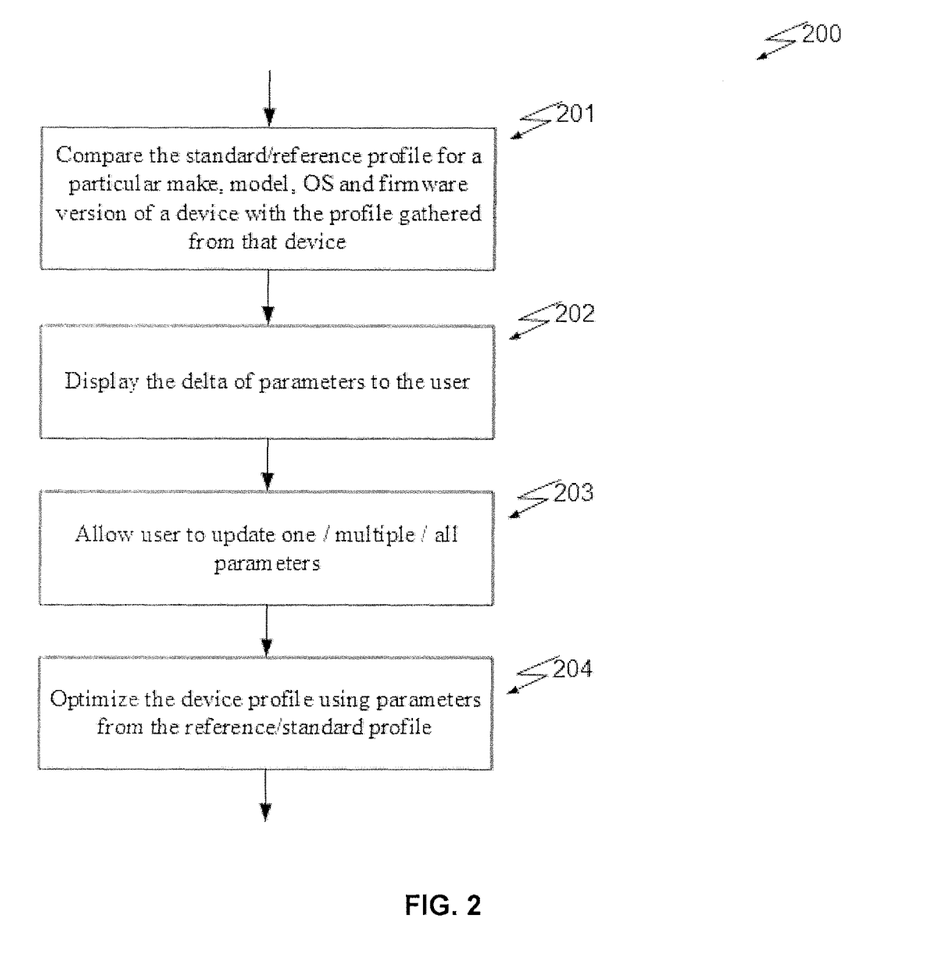
FIG. 2 is a flow diagram of comparing a reference device profile to an individual (target) device.

FIG. 2 shows one embodiment. The standard/reference profile for a particular make, model, OS and firmware version of a device is compared with the profile gathered from the device 201.

In the preferred embodiment there may be a central master repository that stores the reference/standard device profiles for many devices. The standard/reference profiles of one or more devices may be housed on a server. The server(s) may be connected to the Internet for providing an online access method, so that the reference/standard device profiles may be accessible using the internet or other network. In one embodiment the reference/standard device profiles are stored in a database.

Thus for each make and model of a device there may be more than one standard/reference profiles as there may be more than one combination of OS and firmware versions for each device.

Examples of the parameter settings that may be part of a device profile may include, but are not limited to: the device model and manufacture information; applications (commonly referred to as "apps") installed on the device; apps and processing running on the device; certificates on the device; user profile information; the character of any passcode used to authenticate a user (e.g. whether a password/passcode is used and the relative strength of that password, such as the number of characters); operating system of the device; information regarding whether the device operating system has been tampered with by the user (e.g. an iOS device has been jailbroken, or a Google Android device has been rooted); and it may embody the actual, required values for the different fields e.g. SMTP Server, Gateway IP addresses, APN, Build Versions, User name, Passwords, list of malicious apps, etc.

The delta between the parameter values of the reference profile and the parameter values actually on the device may be displayed to the user 202 for example using the display of the device. For example the delta of the parameters may be displayed on a touchscreen of a Smartphone, or the display of a SmartTV etc. For devices that may not have their own native display e.g. a set top box, the system may display the delta of the parameter settings on a display that may be connected to the said device; in this case a TV or a monitor.

The user may be allowed to update one or multiple or all parameters 203. In one embodiment provide a list with check boxes that can be checked by a user in order to select the parameters where the values may be changed. In another embodiment the system may cycle through each setting in a sequence until all parameters have been displayed.

The device profile can be optimized using the parameters from the standard/reference profile 204.

In another embodiment the performance of the device can be fine tuned for better utilization of existing computing resources and services being consumed.

Figure 3:
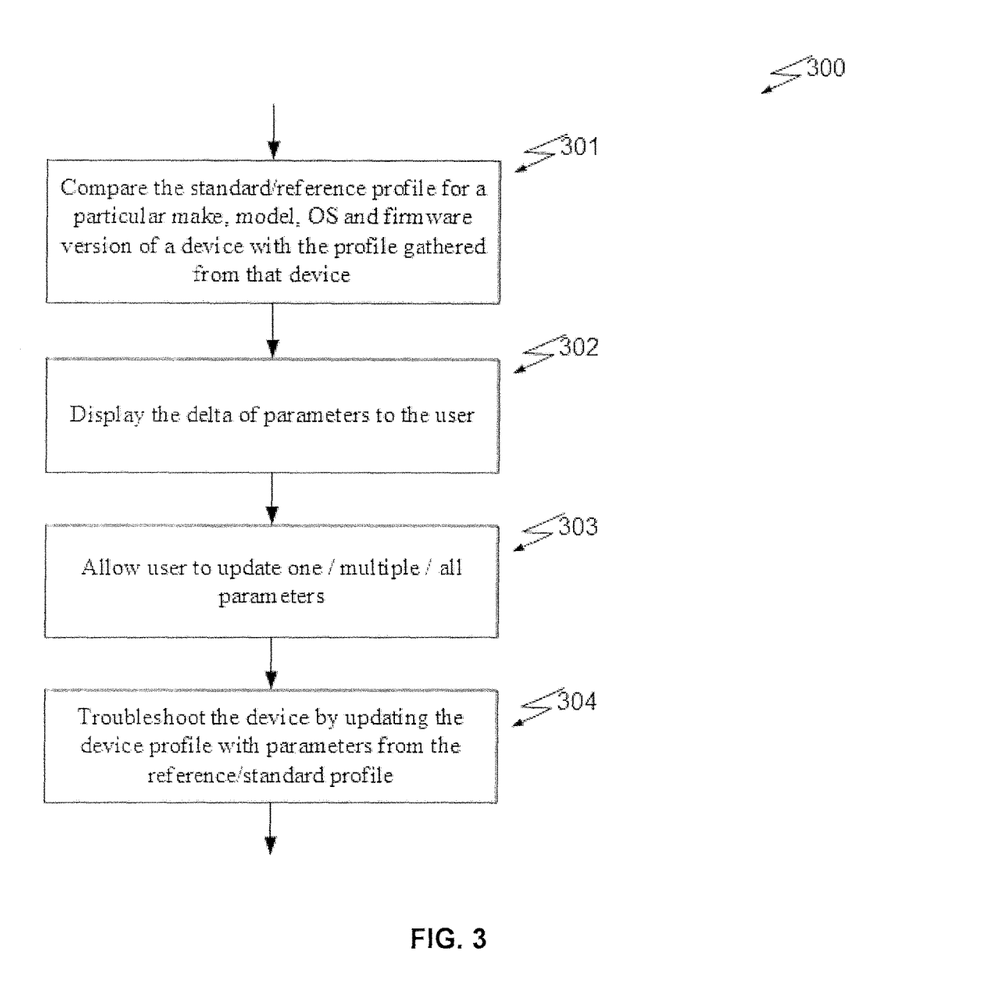
FIG. 3 is a flow diagram of comparing a reference device profile to an individual (target) device with particular attention to troubleshooting the device according to the user's preferences.

Turning to FIG. 3, the standard/reference profile for a particular make, model, OS and firmware version of a device can be compared with the profile gathered from the device 301.

The delta of the parameter values can be displayed to the user 302 for example using the display of the device. For example the delta of the parameters may be displayed on a touchscreen of a Smartphone, or the display of a SmartTV etc. For devices that may not have their own native display e.g. a set top box, the system may display the delta of the parameter settings on a display that may be connected to the said device; in this case a TV or a monitor.

The user may be allowed to update one, multiple or all parameters 303. In one embodiment a list with check boxes may be provided that can be checked by a user in order to select the parameters where the values may be changed. In another embodiment the system may cycle through each setting in a sequence until all parameters have been displayed. The device can be trouble shooted by updating the device profile with the parameters from the standard/reference profile 304.

In one embodiment the app on the device has the logic to apply parameters from the standard/reference device profile to the device profile in use by identifying inaccuracies and inconsistencies.

In one embodiment there may be a rules engine that uses rules to apply this logic. In one embodiment each rule may embody the actual, required values for the different fields e.g. SMTP Server, Gateway IP addresses, APN, Build Versions, User name, Passwords, list of malicious apps, etc. The actual values may be seeded in a rule or could be obtained from another source either on the server or on the device. In one embodiment the execution of the rules allows for the comparison of the values found on the device with the values in the reference/standard profile. If the values are the same, i.e. the value of a filed in the device and the value of the field in the standard/reference profile are equal it is concluded that no changes may be required. If the two values i.e. the value of a field in the device and the value of the field in the standard/reference profile are NOT equal it is concluded that the device is in need of a fix and the value of the field in the device is replaced with the value of field from the reference/standard profile.

These parameter updates may be used to either fix a problem that has been encountered on the device or may be used to fine tune the performance of the device so that it better utilizes the computing resources and services that it consumes.

In one embodiment the value of a parameter field of a device profile setting may be automatically replaced with a parameter setting from the standard/reference profile. In another embodiment the performance of the device may be fine tuned for better utilization of existing computing power and services being consumed by providing a solution where the user may be able to edit, add, delete, modify etc. the values of the parameter settings as required in that particular field.

Figure 4:
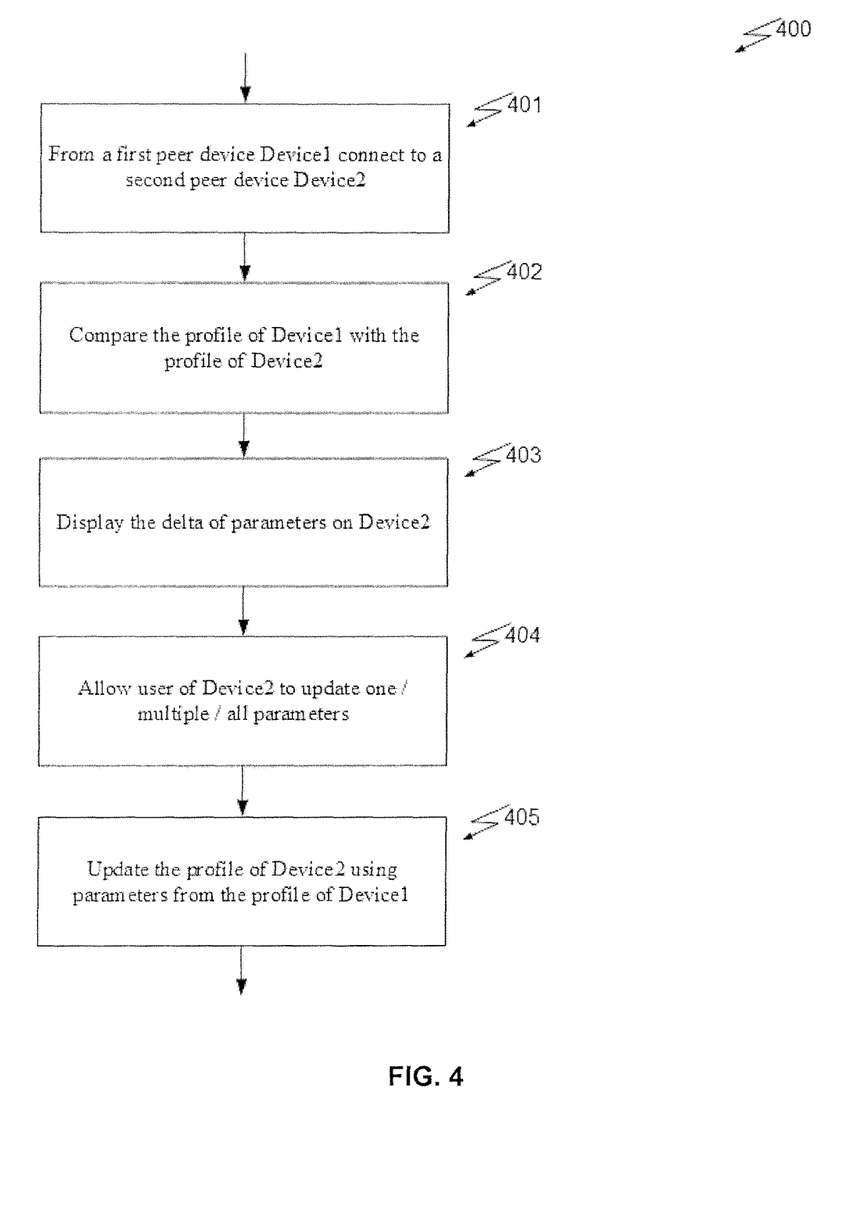
FIG. 4 is a flow diagram of a peer-to-peer device comparison and updating.

FIG. 4 shows an embodiment whereby two peer devices can connect to each other via a peer-to-peer technology e.g. Bluetooth, and after comparing the device profile of a first device with the device profile of a second device, the device profile of the second device may be changed to match the device profile of the first device.

A first peer device Device1 connects to a second peer device Device2 401. In one embodiment the first device Device1 may be a Smartphone of a particular make and model, while the second device is also the same make and model. The connection between peer devices Device1 and Device2 may be over Bluetooth or NFC or WiFi or some other wireless network connectivity method that may be suitable for exchanging information between two peer devices e.g. infrared.

Bluetooth is a technology standard for exchanging data over short distances (using short-wavelength radio transmissions) from fixed and mobile devices, creating personal area networks (PANs) with high levels of security. Bluetooth can connect several devices, overcoming problems of synchronization. Bluetooth is a standard wire-replacement communications protocol primarily designed for low power consumption, with a short range. Because the devices use a radio (broadcast) communications system, they do not have to be in visual line of sight of each other.

In one embodiment there may be an app that may have an agent that has the capability to connect to a peer device and provides a user interface using which a user may be able to compare and update the device profile by changing one or multiple or all parameters of the device profile.

The device profile of the first peer device Device1 may be compared with the device profile of the second peer device Device2 402. The comparison may be displayed on the display of either one or both of the peer devices.

The delta of the parameters may be displayed on Device2 403 for example using the display of the device. In one embodiment the delta of the parameters may be displayed on a touchscreen of a Smartphone, or the display of a SmartTV etc. For devices that may not have their own native display e.g. a set top box, the delta of the parameter settings may be displayed on a display that may be connected to the said device; in this case a TV or a monitor.

The user of Device2 may be allowed to update one or multiple or all parameters 404. In one embodiment a list with check boxes may be provided that can be checked by a user in order to select the parameters where the values may be changed. In another embodiment the system may cycle through each setting in a sequence until all parameters have been displayed.

In one embodiment a solution may be provided where the user may be able to edit, add, delete, and modify etc. the parameter settings (values) required in a field before updating.

The device profile of Device2 may be updated using the parameters from the device profile of Device1 405.

Taking one example, User1 and User2 have devices Device1 and Device2 respectively. For example, Device1 and Device2 are Smartphones with the same make, model and version.

User1 complains his Smartphone Device1 will not connect to a computer. User2 does not have the same problem with Device2, and is able to connect to the computer. Device1 and Device2 connect via a peer-to-peer technology e.g. Bluetooth. Upon comparison of device profiles, it is determined that User1 has USB debugging turned on for Device1, while USB debugging is turned-off on Device2. User1 is presented with an option via a user interface to turn USB debugging off. User1 makes a change to the profile of Device1 and is now able to connect to the computer.

In an alternate embodiment the device profile of Device1 may be the standard/reference profile as described earlier.

Figure 5:
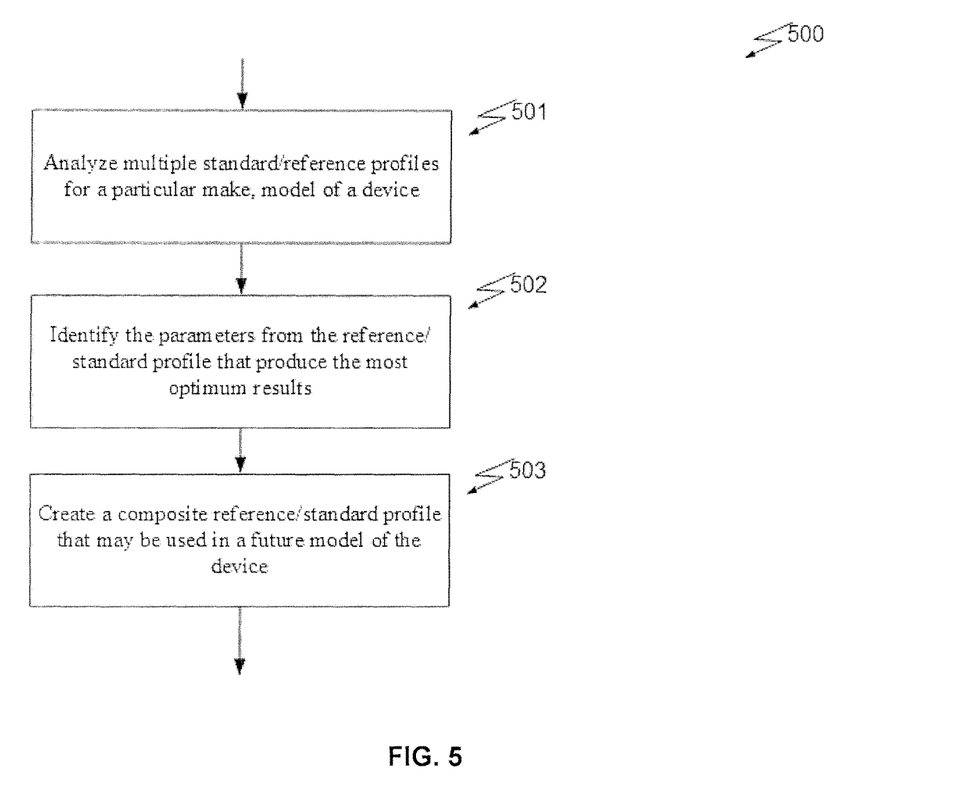
FIG. 5 is a flow diagram of the steps of determining a reference device profile for optimum results for a particular make and/or model of a device.

FIG. 5 shows an embodiment whereby a method of creating a device profile of a future device using a large number of standard/reference device profiles of same or similar make, model, OS and firmware versions.

Multiple standard/reference device profiles for a particular make and model of a device are analysed 501. The analysis of the device profile parameters may be carried out using a rules engine. A rules engine is a software system that executes one or more rules in a runtime environment. A rule engine may be viewed as a sophisticated if/then statement interpreter. The if/then statements that are interpreted are called rules.

The parameters from the multiple standard/reference device profiles that produce the most optimum results identified 502.

A composite standard/reference device profile is created that can be used in a future model of that device 503.

Figure 6:
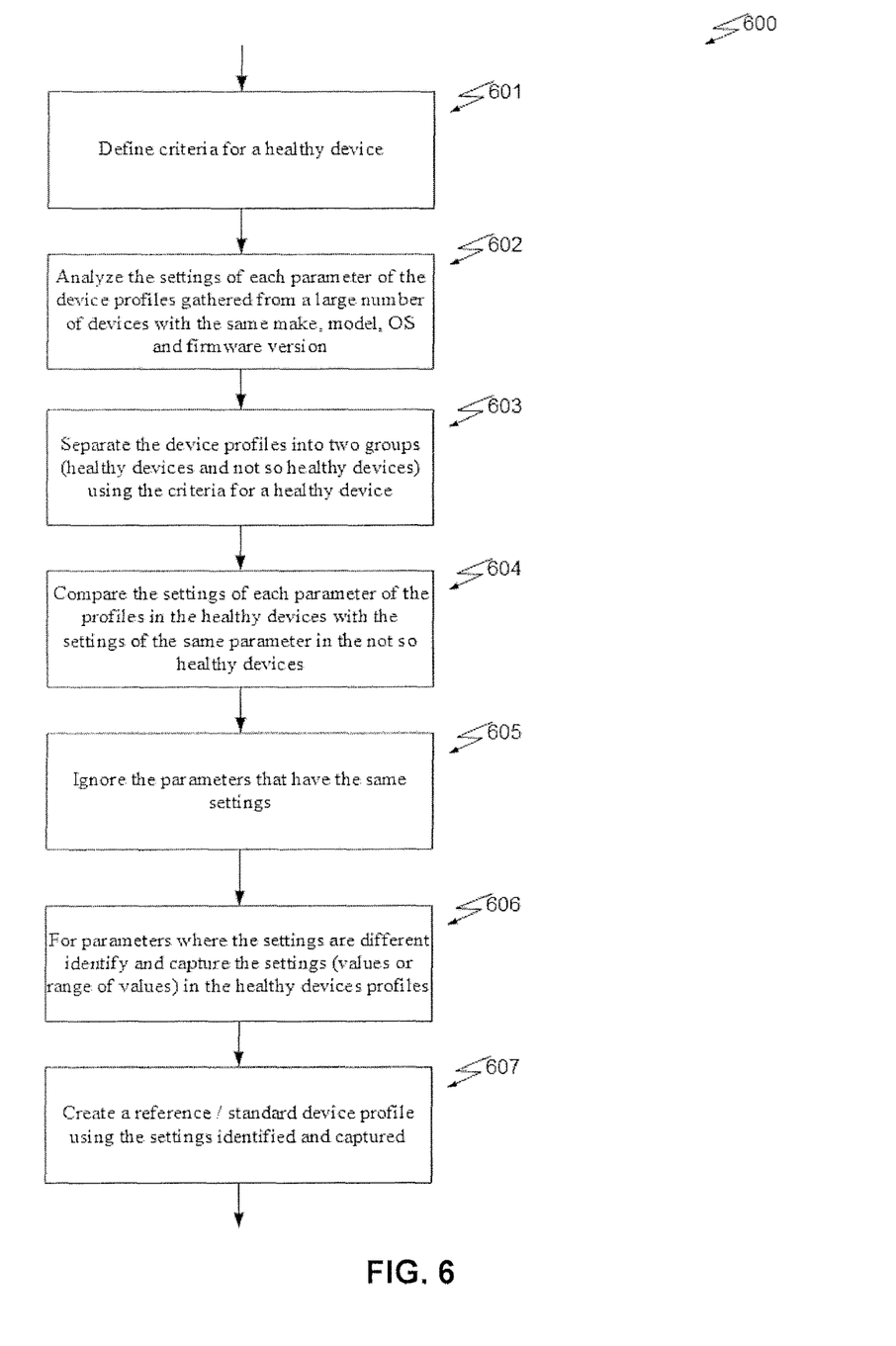
FIG. 6 is a flow diagram of the steps of comparing healthy and not so healthy devices to establish a reference device profile.

FIG. 6 shows the process for analyzing profiles for creating a reference/standard device profile. Criteria are defined for a healthy device 601. In one embodiment the criteria to define a healthy device may include but is not limited to length of error logs, severity of errors in the error log, number of crashes, mean-time-between crashes, number and length of calls to the customer service department of the device or service provider, types of problems reported to the customer care representative (CSR), etc.

Preferably there may be separate criteria for each of the devices. There may preferably be a graphical user interface for entering the criteria for each device.

The settings of each parameter of the device profiles gathered from a large number of devices with the same make, model, OS and firmware version are analysed 602. As mentioned earlier, the profiles may be gathered over a period of time from multiple devices that have the same make, model, OS and firmware version e.g. Samsung Galaxy S4 running Android 4.2.2 and firmware version XXUBMG9.

In one embodiment the analysis may use the MapReduce technique. MapReduce is a programming model for processing large data sets with a parallel, distributed algorithm on a cluster of computers. MapReduce is often used for processing parallelizable problems across large datasets, and the analytic processing can occur on data stored either in a file system (unstructured) or in a database (structured).

MapReduce refers to two separate and distinct tasks that are performed on the dataset. The first is the map job, which takes a set of data and converts it into another set of data, where individual elements are broken down into tuples (key/value pairs). The second is the reduce job which takes the output from a map job as input and combines those data tuples into a smaller set of tuples. As the sequence of the name MapReduce implies, the reduce job is always performed after the map job.

MapReduce libraries have been written in many programming languages, with different levels of optimization. For example, one open source implementation is Apache Hadoop. MapReduce is useful in a wide range of applications, including distributed pattern-based searching, distributed sorting, index construction etc.

In one implementation in order to speed up the processing time, a large set of data that is being analyzed may be broken down into smaller chunks and each chunk is then analyzed by a separate node in parallel. The results from each node are then combined.

In another implementation, the parallel processing may be broken down based on a setting of the device profile, where each node then only processes data regarding that setting. The Hadoop Distributed File System (HDFS) is a distributed file system designed to run on commodity hardware and can be leveraged for this process. For example device profiles can be stored in columns and one node may process all Bluetooth settings, while another node processes all settings for WiFi, and yet another node processes all installed applications. The results are then combined offering a faster processing time.

The device profiles may be separated into two groups (healthy devices and not so healthy devices) using the criteria for a healthy device 603. In one embodiment preferably device profiles that meet the criteria defined for a healthy device may be considered healthy devices and put into a first group, while device profiles that do not meet this criteria may be deemed not so healthy and put into the second group.

The settings of each parameter of the profiles in the healthy devices are compared with the settings of the same parameters in the not so healthy devices 604.

The parameters that have the same settings can be ignored 605. For parameters where the settings are different, the settings (values or range of values) in the healthy device profiles can be identified and captured 606.

A reference/standard device profile can be created using the settings identified and captured 607.

One embodiment is exemplified with the following example of device profile analysis where criteria for a healthy device includes a log file with fewer than 5 errors, no device crashes in the last one week, and no malware (e.g. DroidDream or an app containing DroidDream) installed on the device.

Using this criteria, the profiles can be analysed and put them into two sets: profiles of healthy devices and profiles of not so healthy devices. Using MapReduce, the system can map and then reduce the parameters for each setting in the profiles in the healthy devices set and create tuples T1 (key/value pairs). The MapReduce algorithm can be performed on the set of profiles in the not so healthy devices, creating tuples T2 (key/value pairs).

The tuples T1 (key/value pairs) can be compared with tuples T2 (key/value pairs). For tuples T1 that are the same/equal (or within a range) as tuples T2, the key/value pairs can be ignored. For tuples T1 that are different than tuples T2, identify the key/value pairs in T1 can be identified to create a standard/reference profile.

In one embodiment there may be a master repository that contains all the reference/standard profiles for all devices. From this master repository, subsets of device profiles may be propagated to other databases that may be either specific to a manufacturer e.g. a database of all device profiles for Samsung devices or may be specific to a service provider e.g. all device profiles of devices being used by AT&T customers.

There may be several methods of disseminating the reference/standard device profiles from the master rules repository to the manufacturer or operator specific device profile repositories. In one embodiment a sub-set of the reference/standard device profiles may be pushed from the master reference/standard device profiles repository to the manufacturer or operator specific device profile repositories. In another embodiment a sub-set of the device profile may be pulled by the manufacturer or operator specific device profile repositories from the master device profile repository. The push or the pull may be based on either a schedule or may be based on meeting some pre-set conditions. The invention is not limited to these exemplary embodiments and in fact may use any other method that may be suitable and the ones skilled in the art may be familiar with.

In some embodiments, these steps may be repeated as often as necessary to keep the device profile databases up to date. Thus for example in one embodiment the synchronization process may be repeated every few minutes, or once an hour or once a day while in another embodiment they may be repeated once a week, while in other embodiments they may be repeated once a month or every time there is a defined event e.g. a new reference/standard device profile is created or updated.

In an alternate embodiment this frequency may be customizable while in another embodiment the frequency may be based on the rate of failures encountered by the device. In yet another embodiment these updates may be pushed from the master repository to the regional repository if they are considered to be urgent or critical.

In one embodiment at pre-configured intervals, a newly published reference/standard device profile in a master repository may be re-evaluated against the previous reference/standard device profile before it is synchronized with the regional repositories.

It should be understood that although the term application (or app) has been used as an example in this disclosure, but in essence the term may also imply to any other piece of software code where the embodiments are incorporated. The software application can be implemented in a standalone configuration or in combination with other software programs and is not limited to any particular operating system or programming paradigm described here.

Several exemplary embodiments/implementations have been included in this disclosure, but the intent is to cover all such areas that may be benefit from the present system and method.

The above examples are not intended to be limiting, but are illustrative and exemplary.

The examples noted here are for illustrative purposes only and may be extended to other implementation embodiments. While several embodiments are described, there is no intent to limit the disclosure to the embodiment(s) disclosed herein. On the contrary, the intent is to cover all practical alternatives, modifications, and equivalents.

What is claimed is:

1. A method of determining a reference device profile, comprising:
   using a server in communication with device agents in a plurality of devices to gather device profiles of those devices where the devices have at least one characteristic in common, each device profile having a plurality of parameter values;
   using a rules engine executing one or more rules in a runtime environment on the server to compare lengths of error logs of the plurality of device profiles in order to isolate device profiles having the shortest error logs from the remaining device profiles;
   further using the rules engine to identify parameter values of the isolated device profiles by comparing their parameters in tuples T1 and T2 with the parameters of the remaining device profiles and ignoring any tuple pairs that are matching; and
   compiling the identified parameter values from the T1 to build a reference device profile.

2. The method of claim 1, wherein the at least one characteristic in common is make, model, OS or firmware version.

3. The method of claim 1, wherein the at least one characteristic in common is a region or location.

4. The method of claim 1, wherein the at least one characteristic in common is a usage pattern or type of usage.

5. The method of claim 1, further comprising:
   using the server to gather a profile of a target device from a device agent on the target device;
   using the rules engine to compare the gathered profile to the reference device profile; and
   displaying the delta between parameters of the reference device profile and corresponding parameters of the gathered profile.

6. The method of claim 5, wherein the displaying step comprises displaying on the target device.

7. The method of claim 5, wherein the displaying step comprises displaying on a display in communication with the target device.

8. The method of claim 5, further comprising providing an option to conform a parameter of the gathered profile to match or approximate that of the reference device profile.

9. The method of claim 5, further comprising automatically resetting or adjusting a parameter of the gathered profile to match or approximate that of the reference device profile.

10. The method of claim 1, wherein the comparing step uses a MapReduce algorithm.

11. The method of claim 1, wherein the device profiles are stored in columns and each individual parameter or group of parameters is processed by a node, such that multiple nodes are processing in parallel with each other.

12. The method of claim 1, wherein the comparing and identifying steps are repeated iteratively.

* * * * *